(12) United States Patent
Barrego

(10) Patent No.: US 9,982,437 B2
(45) Date of Patent: May 29, 2018

(54) PATTERNED ROOFING UNDERLAYMENT

(75) Inventor: Pter Barrego, Newport, RI (US)

(73) Assignee: PrimeSource Building Products, Inc., Irving, TX (US)

( * ) Notice: Subject to any disclaimer, the term of this patent is extended or adjusted under 35 U.S.C. 154(b) by 680 days.

(21) Appl. No.: 12/705,749

(22) Filed: Feb. 15, 2010

(65) Prior Publication Data

US 2010/0212235 A1    Aug. 26, 2010

Related U.S. Application Data

(60) Provisional application No. 61/154,930, filed on Feb. 24, 2009.

(51) Int. Cl.
*E04D 12/00* (2006.01)
*E04G 21/24* (2006.01)

(52) U.S. Cl.
CPC ........ *E04D 12/002* (2013.01); *B32B 2419/06* (2013.01); *E04G 2021/248* (2013.01)

(58) Field of Classification Search
CPC ................................................ E04G 2021/248
USPC .... 52/3, 105, 314, 555, DIG. 12; 428/195.1; 442/38, 43, 49, 185, 186; 40/604
See application file for complete search history.

(56) References Cited

U.S. PATENT DOCUMENTS

| | | | |
|---|---|---|---|
| 1,454,323 A * | 5/1923 | Macinnes | 427/188 |
| 1,630,085 A * | 5/1927 | Humphreys et al. | 428/173 |
| 1,642,955 A * | 9/1927 | Humphreys et al. | 428/167 |
| 1,697,426 A * | 1/1929 | Humphreys et al. | 428/167 |
| 1,871,887 A * | 8/1932 | Jasinski | 427/204 |
| 3,541,745 A * | 11/1970 | Probst | 52/105 |
| 3,663,350 A | 5/1972 | Stokes | |
| 3,763,609 A * | 10/1973 | Probst | 52/105 |
| 4,452,850 A | 6/1984 | Even | |
| 4,670,503 A | 6/1987 | Neumann | |
| 5,523,357 A | 6/1996 | Peterson | |
| 5,593,766 A | 1/1997 | Woiceshyn | |
| 5,657,603 A | 8/1997 | Goodhart | |
| 5,687,517 A * | 11/1997 | Wiercinski et al. | 52/177 |
| 5,843,554 A | 12/1998 | Katz | |
| 6,054,178 A | 4/2000 | Howells | |
| 6,308,482 B1 | 10/2001 | Strait | |
| 6,355,329 B1 | 3/2002 | Rose | |
| 6,544,909 B1 | 4/2003 | Yang | |
| 6,583,202 B1 * | 6/2003 | Grube et al. | 524/68 |
| 6,764,968 B1 * | 7/2004 | Hindi et al. | 442/37 |
| 6,864,194 B2 * | 3/2005 | Hindi et al. | 442/37 |
| 6,925,766 B2 | 8/2005 | Di Pede | |
| 7,148,160 B2 | 12/2006 | Porter | |
| 7,178,306 B2 | 2/2007 | Fritz | |
| 7,393,799 B2 | 7/2008 | Porter | |
| 7,745,353 B2 * | 6/2010 | Arthurs et al. | 442/2 |
| 7,772,136 B2 * | 8/2010 | Arthurs et al. | 442/2 |
| 2003/0118852 A1 | 6/2003 | Venkataswamy | |

(Continued)

FOREIGN PATENT DOCUMENTS

CA         2770783 A1 *   9/2012   ............ B32B 5/024

*Primary Examiner* — Robert Canfield
(74) *Attorney, Agent, or Firm* — Fogarty LLP

(57) ABSTRACT

A lightweight thermoplastic polyolefin roofing underlayment with superior tear strength is disclosed having a printed upper surface simulating the appearance of a finished roof. The underlayment is reinforced with a woven polypropylene scrim. Anti-skid materials can be incorporated into the body of the underlayment.

16 Claims, 2 Drawing Sheets

(56) References Cited

U.S. PATENT DOCUMENTS

| | | | |
|---|---|---|---|
| 2003/0215594 A1* | 11/2003 | Hamdar et al. | 428/40.1 |
| 2004/0115400 A1* | 6/2004 | Lefebvre et al. | 428/143 |
| 2004/0127120 A1 | 7/2004 | Zanchetta | |
| 2004/0157075 A1 | 8/2004 | Yang | |
| 2005/0066593 A1* | 3/2005 | Haas et al. | 52/198 |
| 2005/0097857 A1 | 5/2005 | Mehta | |
| 2005/0170720 A1 | 8/2005 | Christiansen | |
| 2005/0210802 A1 | 9/2005 | Yang | |
| 2005/0210808 A1* | 9/2005 | Larson et al. | 52/555 |
| 2005/0227086 A1 | 10/2005 | Murphy | |
| 2005/0229504 A1* | 10/2005 | Bennett et al. | 52/105 |
| 2006/0046084 A1* | 3/2006 | Yang et al. | 428/500 |
| 2006/0228962 A1* | 10/2006 | Souther et al. | 442/79 |
| 2006/0292945 A1 | 12/2006 | Kuhn | |
| 2007/0010152 A1* | 1/2007 | Kwon | C08J 7/04 442/189 |
| 2007/0079926 A1* | 4/2007 | Mehta et al. | 156/219 |
| 2007/0275621 A1* | 11/2007 | Bennett | B32B 27/12 442/268 |
| 2007/0277450 A1 | 12/2007 | Raulie | |
| 2007/0281119 A1* | 12/2007 | Di Stefano et al. | 428/40.1 |
| 2008/0020662 A1 | 1/2008 | Strait | |
| 2008/0102242 A1* | 5/2008 | Hamdar et al. | 428/41.8 |
| 2008/0141604 A1* | 6/2008 | Arthurs et al. | 52/408 |
| 2008/0193716 A1* | 8/2008 | Arthurs et al. | 428/141 |
| 2009/0011675 A1* | 1/2009 | Ratcliff | B32B 11/10 442/327 |
| 2009/0110883 A1* | 4/2009 | Hughes | B32B 3/30 428/141 |
| 2010/0056004 A1* | 3/2010 | Galvin | B32B 27/12 442/101 |
| 2010/0092736 A1* | 4/2010 | Nishikawa | 428/195.1 |
| 2010/0178827 A1* | 7/2010 | Thai et al. | 442/245 |
| 2010/0215924 A1* | 8/2010 | Di Pede | 428/196 |
| 2010/0233442 A1* | 9/2010 | Seo | 428/195.1 |
| 2011/0009024 A1* | 1/2011 | Clark | B32B 27/08 442/381 |
| 2011/0244742 A1* | 10/2011 | Huang et al. | 442/49 |
| 2016/0123015 A1* | 5/2016 | Granovsky | B32B 38/06 428/141 |

* cited by examiner

PATTERNED ROOFING UNDERLAYMENT

CROSS-REFERENCE TO RELATED APPLICATION

This application claims the benefit pursuant to 35 U.S.C. § 119(e) of U.S. Provisional Application No. 61/154,930 filed Feb. 24, 2009.

BACKGROUND OF THE INVENTION

Hurricane Katrina, Florida hurricanes, tornadoes and freak winds often wreak havoc on roofing, particularly that in residential communities. The aftermath of these devastating natural disasters is usually a sea of blue tarpaulins covering the damaged roofing while the homeowners await insurance settlements and permanent repairs. This "sea" of blue (or other color) tarps is visually unsightly and creates a negative aura about a community. This negative can have a serious psychological impact on residents and generally downgrade the inherent value of property in and around the "sea" of ugly tarps.

There is thus a need for a substitute for these "ugly" tarps which can both protect a damaged roof as well as provide a more aesthetically pleasing appearance to the roof before it is reshingled or retiled.

Aside from emergencies, roofs regularly need to be repaired and replaced. An initial step in replacing a roof is removal of existing shingles, shakes or tiles plus the waterproof underlayment. The latter is typically "felt paper" which is a rolled sheet material impregnated with a bituminous substance. Such material by itself will typically only provide moisture protection to the underlying building structure for a few weeks. Thus, there is a need for a longer lasting waterproof underlayment that can protect structures for longer periods of time.

In addition, underlayments such as "felt paper" are very heavy, typically 0.176 lb/sq. ft. This weight limits the roll size of such underlayments to about 225-250 square feet when unrolled. Thus, there is a need for a lightweight, durable underlayment that can be supplied in larger roll sizes that cover more roof area per roll and is easier to lift and unroll than "felt paper" and similar underlayment.

Whatever the circumstance, hurricane or periodic roof replacement, it is desirable that an underlayment be available to a roofer that is less unsightly than the typical "tarp" or felt paper, yet is durable enough to remain in place for extended periods before permanent roofing (shingles, tiles, etc.) can be installed.

SUMMARY OF THE INVENTION

These and other needs are satisfied by providing a thin (6 to 15 mils), but tough, patterned underlayment for covering damaged roofs or those undergoing normal replacement of shingles, tiles, etc. or even newly constructed buildings. A pattern is printed on the underlayment that has the appearance, from a reasonable distance, of a three dimensional built-up roof structure typical of those in a particular geographic region. For example, tile roofs are common in many areas of the United States such as Florida, the Southwest, and California. In the northern climes, asphalt shingles dominate. The printed pattern on the underlayment of this invention to all outward appearances looks much like a finished roof in these, or other, regions.

This simulated finished roof appearance substantially avoids the visual stigma associated with typical temporary roof covering, whether tarp-like, bituminous felt or other. In emergencies the sea of blue tarps is replaced by a real roof look-alike. Instead of ugly black felt paper, awaiting a permanent shingle or tile covering, the underlayment of this invention provides new roofs, or those under revision, with a visual simulation of a finished tile or shingle covering.

The body of the underlayment is preferably formed by extrusion coating over a woven web of reinforcing scrim. The scrim used in this invention is preferably formed of narrow polypropylene strips interwoven to form a web that provides substantial strength to the roofing underlayment in multiple directions as generally disclosed in U.S. Pat. No. 5,843,554. The scrim is embedded in a layer of durable thermoplastic polyolefin. An example of such a material would be an extrudable combination of polypropylene and polyethylene with a suitable elastomer and filler, often referred to as thermoplastic olefin or TPO. Such, or like material, form a strong underlayment which can withstand the onslaught of rain, wind, snow, etc. The underlayment is strengthened by the reinforcing scrim in the underlayment providing tensile strength to the underlayment in multiple directions.

A non-skid material can be incorporated into the thermoplastic olefin or like underlayment material used. This enhances worker safety during installation of the underlayment and covering roof material.

Applicant's underlayment differs from other printed roofing materials in the manner described below. United States Patent Application Publication No. U.S. 2005/0210808 published Sep. 29, 2005 describes a roofing membrane which is used as a substitute for laid shingles or tiles [0002, 0020]. There is no disclosure of the membrane as an underlayment roofing material to temporarily enhance the environment around roofs before finished roofing material is applied over the underlayment. Typical membranes are relatively much thicker and heavier than the underlayment of this invention. The National Roofing Contractors Association (NRCA) describes roofing membranes made of thermoplastic olefins as having typical thicknesses of 40-100 mils. (www.nrca.net/consumer/types/thermop.aspx).

United States Patent Application Publication No. 2007/0079926 dated Apr. 12, 2007 discloses the printing and/or embossing of the illusion of a shingled or tiled roof on a membrane that is used as a substitute for laying individual shingles, shakes, or tiles [003, 005, 0014, 0023]. There is no reference to temporary use of this membrane as an underlayment that can be used to create the illusion of a finalized roof before the finished roof is applied.

DETAILED DESCRIPTION OF THE INVENTION

Figure 1:
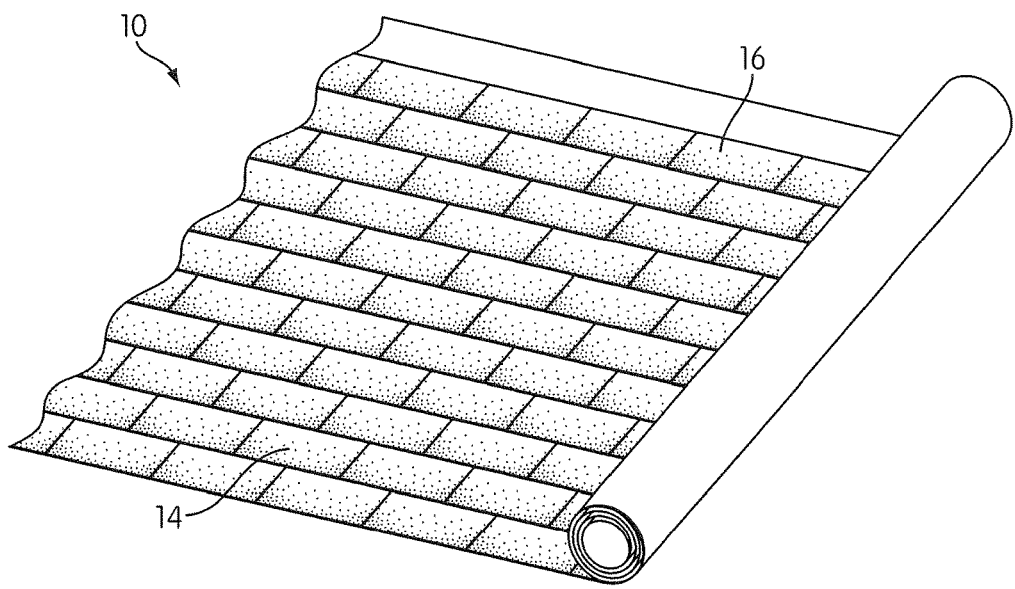
FIG. 1 illustrates a partially unrolled portion of one embodiment of the underlayment with a patterned upper surface resembling a shingle roof.

The roofing underlayment of this invention is preferably of a lightweight, but strong, construction that will withstand the ravages of weather for a period of time until permanent roofing is applied over it—usually not more than six months. Accordingly, the underlayment is typically about 6-15 mils (0.006-0.015 inches) thick having an average weight of 0.016 to 0.027 pounds per square foot which is about ⅕th the weight of felt paper. Because this underlayment is so light in weight it can be sold in rolls much wider and longer than the typical bituminous base felt paper. The underlayment's lighter weight per roll, versus felt paper, facilitates faster application to roofs. FIG. 1 illustrates the rolled underlayment of this invention 10 with a pattern 16 printed on the top upper surface 14 of the underlayment 10.

Figure 2:
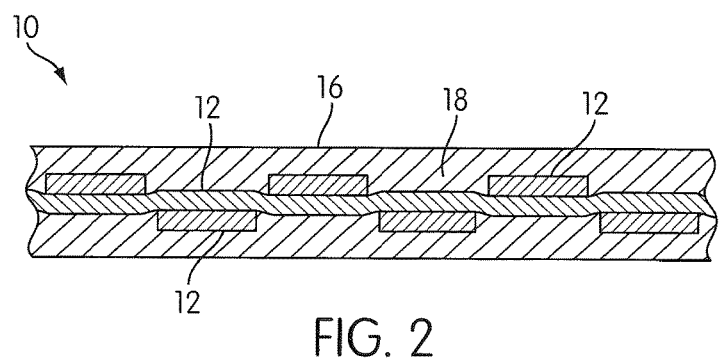
FIG. 2 is a partial cross-section of the underlayment illustrating the scrim placement within the underlayment.

A preferable backbone for this underlayment 10 is a woven polypropylene scrim 12 providing multidirectional strength to the underlayment (FIG. 2). The scrim 12 is centered within of tough thermoplastic olefin, or like, material 18 in a manner that it completely surrounds and adheres to all surfaces of the scrim 12 until they become essentially a single sheet. Preferably, the underlayment 10 is formed in a manner that the thermoplastic polyolefin body 18 impregnates and attaches itself to the reinforcement scrim 12 during formation. A preferred method of manufacture includes use of a rubber roll calendaring process where one or more layers of thermoplastic olefin material and the scrim are run through a nip between calendaring rolls. As these materials pass thru the rolls the thermoplastic polyolefin material and scrim are compressed together which allows the thermoplastic olefin material 18 to impregnate and attach itself to the scrim 12.

The scrim reinforcement 12 for the underlayment 10 is preferably made from polypropylene tape approximately ¼ inch in width which is interwoven to form a mesh having substantial strength in multiple directions as described in Katz U.S. Pat. No. 5,843,554.

The underlayment maintains a tensile strength of well over 20 pound foot/inch width (lbf/in) even after simulated exposure to accelerated aging and sunlight. The following Table 1 illustrates some of the extensive tensile strength testing done on one embodiment of this invention.

TABLE 1

Table 1: Tensile Strength Synthetic Underlayment

| Condition | Test | Foot pounds/ inch of width | | AC188 | |
| --- | --- | --- | --- | --- | --- |
| | | MD | XMD | Criteria | Pass/Fail |
| As Received | 1 | 121.7 | 117.3 | ≥20 lbf/ in width | Pass |
| | 2 | 119.6 | 108.5 | | |
| | 3 | 123.9 | 123.4 | | |
| | 4 | 108.4 | 111.2 | | |
| | 5 | 110.3 | 109.9 | | |
| | 6 | 118.9 | 117.1 | | |
| | 7 | 114.8 | 105.2 | | |
| | 8 | 109.2 | 114.1 | | |
| | 9 | 113.4 | 111.8 | | |
| | 10 | 116.4 | 108.4 | | |
| | Avg: | 115.7 | 112.7 | | |
| | Std. Dev: | 5.4 | 5.4 | | |
| After Accelerated Aging | 1 | 117.1 | 102.0 | ≥20 lbf/ in width | Pass |
| | 2 | 120.5 | 95.0 | | |
| | 3 | 121.6 | 101.6 | | |
| | 4 | 123.7 | 93.5 | | |
| | 5 | 96.7 | 96.7 | | |
| | 6 | 118.9 | 104.5 | | |
| | 7 | 125.7 | 96.6 | | |
| | 8 | 119.3 | 103.0 | | |
| | 9 | 103.7 | 102.7 | | |
| | 10 | 113.6 | 91.6 | | |
| | Avg: | 116.1 | 98.7 | | |
| | Std. Dev: | 9.2 | 4.6 | | |
| After UV Exposure | 1 | 115.4 | 90.3 | ≥20 lbf/ in width | Pass |
| | 2 | 114.5 | 98.5 | | |
| | 3 | 114.7 | 94.5 | | |
| | 4 | 117.2 | 97.3 | | |
| | 5 | 121.6 | 95.5 | | |
| | 6 | 126.0 | 94.0 | | |
| | 7 | 126.6 | 95.5 | | |
| | 8 | 118.7 | 94.1 | | |
| | 9 | 103.0 | 97.0 | | |
| | 10 | 118.7 | 85.0 | | |
| | Avg: | 117.6 | 93.9 | | |
| | Std. Dev: | 6.7 | 4.7 | | |

This testing was done with underlayment specimens of this invention which were subjected to accelerated aging and UV exposure. The specimens subjected to the accelerated aging were pretreated in accordance with standards established by ICC Evaluation Service, Inc. (ICC-ES), a non-profit organization which establishes Acceptance Criteria (AC) for technical evaluation of building materials. Among these Acceptance Criteria is AC48 for roofing underlayments. Pursuant to AC48, section 4.7, the specimens were first subjected to an air temperature of 77° F. for 24 hours followed by 25 repetitive cycles, each consisting of (i) heat exposure (120° F.) for 3 hours, (ii) immersion in room temperature water for 3 hours and (iii) air drying at 73° F. for 18 hours. UV exposure specimens were pretreated (24 hours at 77° F.) as above followed by exposure to ultraviolet light for 210 hours (10 hours/day for 21 days) in accordance with AC 48, section 4.8.1.

The above table shows that the underlayment specimens retained 80-plus percent of their tensile strength even after being subjected to aging and exposure to UV light that closely simulates the placement of the claimed underlayment on a roof for long periods before finish roofing materials are applied. This table also shows that the claimed underlayment far exceeds the minimum tensile strength criteria (AC 188) of the industry standard (20 foot-pounds/inch width) for underlayment subjected to this testing.

The breaking strength of the subject underlayment was tested pursuant to standards established by the American Society of Testing Materials (ASTM), namely, ASTM D146. Ten 1×6 inch specimens of the underlayment for each direction machine (MD) and cross-machine (XMD) were conditioned for 24 hours at 75° F. before strength testing. The average strength of the 10 specimens was 118 pounds per foot (lbf) in the machine direction and 115 pounds per foot in the cross-machine direction. The range of breaking strength was 113-127 lbf in the machine direction and 103-132 in the cross-machine direction. The results are well above the ASTM D226 criteria of 40 lbf in machine direction and 20 lbf for cross-machine direction, thereby reinforcing the superior strength and durability of the claimed underlayment.

The claimed underlayments weather resistance has also been tested according to well established standards, i.e., ASTM D4869 per AC 188. In this testing the underlayment (15×30 inches) is mounted on a plywood board with the edges overlapped and stapled to the back of the board. The underlayment is then conditioned for 24 hours at 80° F. and 30-55% relative humidity for 24 hours. The mounted underlayment is then positioned at a fourteen degree incline under a showerhead 18 inches above. Water is supplied to the showerhead at a 40 gallon per hour rate for 4 hours. The water is turned off and the plywood is examined for any wetness. The claimed underlayment passed this test. No water transmission through to the plywood was found.

Figure 3:
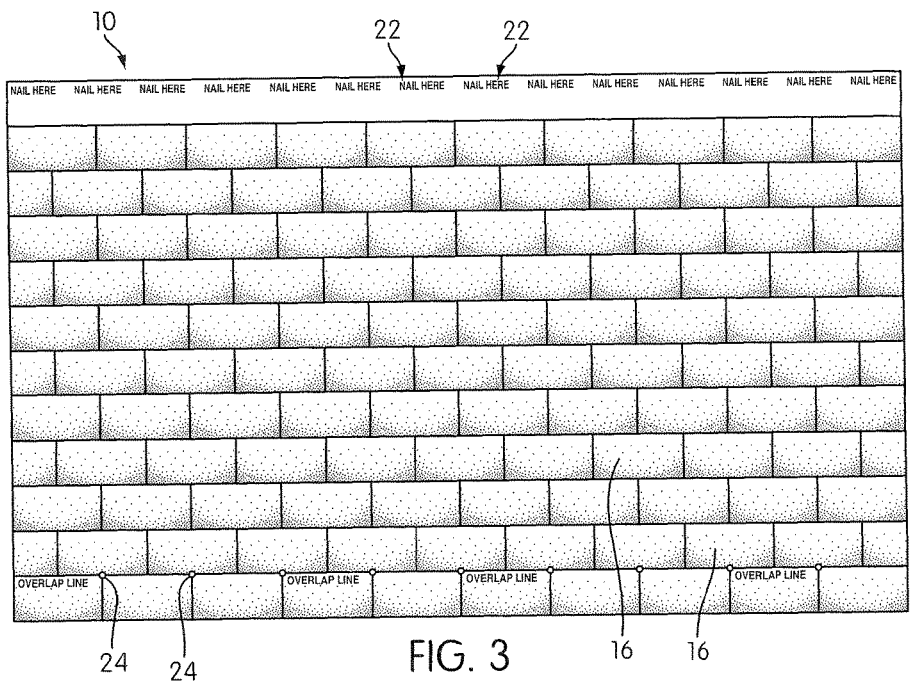
FIG. 3 illustrates a typical printed underlayment of this invention replicating a shingle roof.
Figure 4:
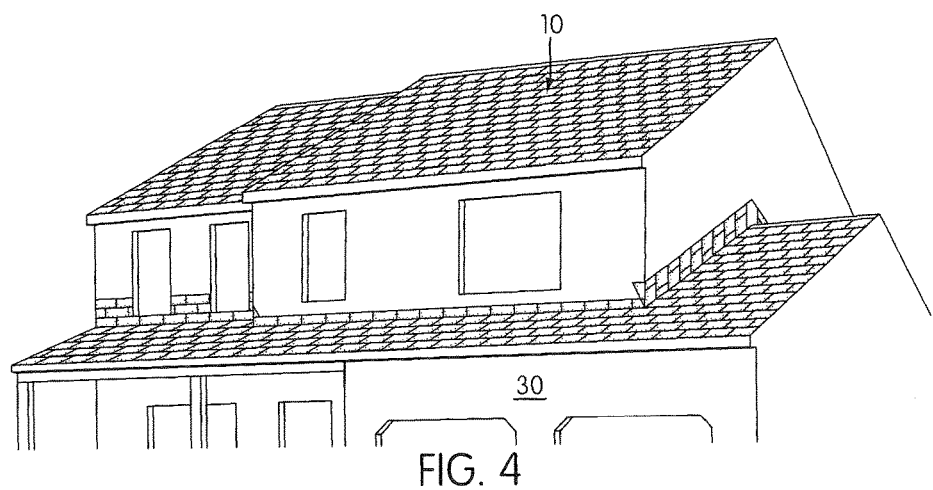
FIG. 4 illustrates the underlayment of this invention installed on a house under construction and temporarily replicating the appearance of shingles that are to be later installed on the house.

The upper surface 14 (facing the elements) of the underlayment 10 is printed with a pattern 16 replicating shingles or like roofing materials as shown in FIGS. 1, 3, and 4. FIG. 3 illustrates a section from a roll of the commercial embodiment of the disclosed invention. A typical roll of this lightweight underlayment 10 covers about 1000 square feet of roof and is about 4 feet in height and 250 feet in length when unrolled, although other dimensions are contemplated with the scope of this invention. The roll weight is about 32 pounds, one fifth the weight of a felt paper covering a comparable area. Thus, the underlayment of this invention offers a considerable lessening of installation cost and improved ease of installation.

As shown in FIG. 3 the underlayment 10 preferably has a printed nail pattern 22 along an upper (as mounted on a slope roof) edge. The lower portion of underlayment 10 also has a printed guide for nailing the underlayment as indicated by the circles 24 along the "overlap lines" printed near the bottom edge of the underlayment 10. Additional nailing of the underlayment to the roof structure can be done at vertical edges where the underlayment overlaps and at other locations away from the edges where needed to secure the underlayment 10 to the underlying roof.

Treatment of permanent roofing membranes, versus underlayments, to simulate the appearance of tiles, shingles or the like is known. However, in the past the printed surface has also been textured to provide depth to the appearance of the membrane such as disclosed in the United States Patent Application Publication No. 2005/0210808 dated Sep. 29, 2005. particularly at [0023-24]. That texturing involves an additional and expensive embossing step to provide an appearance of a finished roof.

Applicant has found that an untextured, printed pattern 16 on the surface 14 of the underlayment 10 provides a suitable simulation of shingles, tiles, etc. thereby reducing the cost of production. Use of inexpensive rotogravure printing onto the underlayment 10 provides an excellent simulation of a real roof. FIG. 4 illustrates installed underlayment 10 with a printed shingle design on a house 30 under construction which gives the house an appealing appearance of completion at minimal cost.

To provide anti-skid properties to the underlayment an additive can be used. A preferred anti-skid additive to the thermoplastic olefin is 1-propene, polymer with ethane (CAS No. 9010-79-1). This anti-skid feature is included so that workers will have secure footing while walking on the temporary underlayment while it is being installed and during reconstruction of the roof.

The anti-skid material can be incorporated into the thermoplastic polyolefin body 18 of underlayment 10 thereby eliminating an extra layer of anti-skid material to the surface of roofing materials such as is the norm with prior art approaches to providing skid resistance to roof materials, for example, as described in U.S. Patent Application Publication No. 2008/0141604 dated Jun. 19, 2008.

The underlayment 10 can also include UV resistant material to prevent degradation from exposure to sunlight. The UV resistance is preferably incorporated into the underlayment 10, including the scrim 12, by first preparing a master batch chip rather than directly adding the UV material during the extrusion step. The master batch chip comprises about 10-15% of a UV powder such as CHIMASORB 944® a trademarked product offered by Ciba Geigy, with the balance of the chip comprising a polyethylene or other polyolefin resin. The master batch chip is then added to the thermoplastic olefin prior to extrusion.

The invention claimed is:

1. A lightweight untextured roofing underlayment comprising a scrim reinforcement made from interwoven polyolefin polypropylene tape located within a thermoplastic olefin body, the underlayment having a thickness of about 6 to 15 mils and an average weight of about 0.016 to 0.027 pounds per square foot, wherein an anti-skid additive is added to the thermoplastic olefin body, and wherein a pattern having the appearance of a shingled roof is printed on at least one surface of the underlayment, wherein the pattern having the appearance of a shingled roof comprises a plurality of rows, each row having a plurality of rectangular shapes, wherein the rectangular shapes in each row are offset horizontally from the rectangular shapes in adjacent rows.

2. The lightweight untextured roofing underlayment of claim 1, wherein the roofing underlayment does not include a separate anti-skid layer.

3. The lightweight untextured roofing underlayment of claim 1, wherein the pattern is printed on the underlayment using a rotogravure process.

4. The lightweight untextured roofing underlayment of claim 1, wherein an ultra-violet resistant material is incorporated into the underlayment.

5. The lightweight untextured roofing underlayment of claim 1, wherein the rectangular shapes in each row have a uniform size.

6. The lightweight untextured roofing underlayment of claim 1, wherein at least one vertical edge of the rectangular shapes in each row is aligned with a middle portion of a rectangular shape in an adjacent row.

7. The lightweight untextured roofing underlayment of claim 1, further comprising an area along a horizontal edge of the at least one surface that is not printed with the pattern.

8. The lightweight untextured roofing underlayment of claim 7, wherein the area not printed with the pattern indicates an upper edge of the lightweight untextured roofing underlayment for installation.

9. A method for installing a roofing material, comprising:
attaching a first section of a roofing underlayment to a roof, the roofing underlayment comprising a lightweight untextured material comprising a scrim reinforcement made from interwoven polyolefin polypropylene tape located within a thermoplastic olefin body, the underlayment having a thickness of about 6 to 15 mils and an average weight of about 0.016 to 0.027 pounds per square foot, wherein an anti-skid additive is added to the thermoplastic olefin body, and wherein a pattern having the appearance of a finished roof is printed on at least one surface of the underlayment, wherein the pattern having the appearance of a finished roof comprises a plurality of rows, each row having a plurality of rectangular shapes, wherein the rectangular shapes in each row are offset horizontally from the rectangular shapes in adjacent rows; and
attaching one or more additional sections of the roofing underlayment to the roof, wherein the one or more additional sections overlap at least one adjacent section of the roofing underlayment.

10. The method for installing a roofing material of claim 9, wherein the sections of the roofing underlayment are attached using nails.

11. The method for installing a roofing material of claim 9, wherein the roofing material does not include a separate anti-skid layer.

12. The method for installing a roofing material of claim 9, wherein the pattern is printed on the underlayment using a rotogravure process.

13. The method for installing a roofing material of claim 9, wherein an ultra-violet resistant material is incorporated into the underlayment.

14. The method for installing a roofing material of claim 9, wherein at least one vertical edge of the rectangular shapes in each row is aligned with a middle portion of a rectangular shape in an adjacent row.

15. The method for installing a roofing material of claim 9, wherein the roofing underlayment further comprises an area along a horizontal edge of the at least one surface that is not printed with the pattern.

16. The method for installing a roofing material of claim 15, wherein the area not printed with the pattern indicates an upper edge of the lightweight untextured roofing underlayment for installation.

* * * * *

UNITED STATES PATENT AND TRADEMARK OFFICE
CERTIFICATE OF CORRECTION

PATENT NO.        : 9,982,437 B2                                    Page 1 of 1
APPLICATION NO.   : 12/705749
DATED             : May 29, 2018
INVENTOR(S)       : Peter J. Barrego It is certified that error appears in the above-identified patent and that said Letters Patent is hereby corrected as shown below:

On the Title Page

In item (75) Inventor, delete "Pter" and insert --Peter J.--.

Signed and Sealed this
Seventeenth Day of July, 2018

Andrei Iancu
*Director of the United States Patent and Trademark Office*